United States Patent
Ben-Nun et al.

(10) Patent No.: US 9,872,185 B1
(45) Date of Patent: Jan. 16, 2018

(54) POLICY ENFORCER IN A NETWORK THAT HAS A NETWORK ADDRESS TRANSLATOR

(75) Inventors: Michael Ben-Nun, Ramat Hasharon (IL); Nery Strasman, Ramat Gan (IL)

(73) Assignee: VASONA NETWORKS LTD., San Jose, CA (US)

( * ) Notice: Subject to any disclaimer, the term of this patent is extended or adjusted under 35 U.S.C. 154(b) by 907 days.

(21) Appl. No.: 13/305,750

(22) Filed: Nov. 29, 2011

Related U.S. Application Data

(63) Continuation-in-part of application No. 13/233,043, filed on Sep. 15, 2011.

(60) Provisional application No. 61/383,414, filed on Sep. 16, 2010.

(51) Int. Cl.
| | | |
|---|---|---|
| H04W 24/08 | (2009.01) | |
| H04W 92/14 | (2009.01) | |
| H04W 36/00 | (2009.01) | |
| H04W 36/30 | (2009.01) | |

(52) U.S. Cl.
CPC ........ *H04W 24/08* (2013.01); *H04W 36/0027* (2013.01); *H04W 36/30* (2013.01); *H04W 92/14* (2013.01)

(58) Field of Classification Search
CPC .. H04L 12/2686; H04L 41/50–41/5003; H04L 41/5009–41/5025; H04L 41/14–41/147; H04L 41/0893; H04L 47/00–47/127; H04L 47/14; H04L 47/18–47/20; H04L 47/22–47/225; H04L 47/24–47/2491
USPC ............... 370/230–236.2, 328, 338, 342; 709/223–226
See application file for complete search history.

(56) References Cited

U.S. PATENT DOCUMENTS

| | | | |
|---|---|---|---|
| 6,385,673 B1 | 5/2002 | DeMoney | |
| 6,697,378 B1 | 2/2004 | Patel | |
| 8,205,004 B1 | 6/2012 | Kaufman | |
| 2003/0067872 A1 | 4/2003 | Harrell et al. | |
| 2004/0203825 A1 | 10/2004 | Cohen | |
| 2004/0213278 A1* | 10/2004 | Pullen et al. | 370/428 |
| 2005/0041584 A1* | 2/2005 | Lau et al. | 370/235 |
| 2005/0114538 A1 | 5/2005 | Rose | |
| 2005/0148314 A1 | 7/2005 | Irizarry et al. | |
| 2005/0204046 A1 | 9/2005 | Watanabe | |
| 2008/0212480 A1 | 9/2008 | Shimonishi | |
| 2009/0327079 A1 | 12/2009 | Parker et al. | |
| 2010/0034089 A1* | 2/2010 | Kovvali et al. | 370/235 |
| 2010/0074275 A1 | 3/2010 | Sahai | |

(Continued)

*Primary Examiner* — Eric Myers
(74) *Attorney, Agent, or Firm* — Reches Patents

(57) ABSTRACT

A method, a computer program product and a device, the method may include: receiving a first signature and first control metadata; the first control metadata is indicative of at least one control plane message that was exchanged between a RAN and a core network and was intercepted by a probe; the at least one control plane message relates to a first entity that belongs to or is coupled to the RAN; processing information packets received by a policy enforcer to provide information packet signatures, the information packets undergone an address translation process before being received by the policy enforcer; and enforcing a policy associated with the first entity, the enforcing affects an information packet that is associated with an information packet signature that equals the first signature; wherein the address translation process does no corrupt the first signature.

43 Claims, 7 Drawing Sheets

(56) References Cited

U.S. PATENT DOCUMENTS

| | | |
|---|---|---|
| 2010/0131671 A1 | 5/2010 | Kohli et al. |
| 2010/0151899 A1* | 6/2010 | Lekutai |
| 2010/0161795 A1* | 6/2010 | Deridder et al. ............ 709/224 |
| 2010/0195602 A1 | 8/2010 | Kovvali et al. |
| 2011/0032898 A1 | 2/2011 | Kazmi |
| 2011/0082924 A1 | 4/2011 | Gopalakrishnan |
| 2011/0145726 A1 | 6/2011 | Wei et al. |
| 2011/0194487 A1* | 8/2011 | Namburi et al. ............ 370/328 |
| 2011/0197239 A1 | 8/2011 | Schlack |
| 2012/0039191 A1 | 2/2012 | Foster |
| 2012/0052866 A1 | 3/2012 | Froehlich et al. |
| 2012/0087260 A1 | 4/2012 | Devarapalli |
| 2013/0016620 A1 | 1/2013 | Den Hartog et al. |
| 2013/0163428 A1 | 6/2013 | Lee |

* cited by examiner

POLICY ENFORCER IN A NETWORK THAT HAS A NETWORK ADDRESS TRANSLATOR

RELATED APPLICATIONS

This application is a continuation in part of U.S. patent application Ser. No. 13/233,043 filed Sep. 15, 2011, which in turn is claims priority from provisional paten filing date Sep. 16, 2010, Ser. No. 61/383,414, both being incorporated herein by reference.

BACKGROUND OF THE INVENTION

Third Generation (3G) Wireless Networks 3G wireless networks may interface with external networks such as the internet. Third generation (3G) wireless networks have a General Packet Radio Service (GPRS) core network that facilitates the transmission of Internet Protocol (IP) packets between the 3G wireless network and the internet. The GPRS core network may use a GPRS tunneling protocol that allows users of the 3G wireless network to be coupled to external packet switched networks (such as the Internet) while moving from one location to the other. The GPRS may include various components such as the Service GPRS Support Node (SGSN) and Gateway GPRS Support node (GGSN). The SGSN can interface with a Radio Network Controller (RNC).

The functionality of the different 3G wireless network components is known in the art and defined in various known standards. One non-limiting explanation relating to the SGSN, the RNC and the GGSN can be found in www.wikipedia.org.

Gateway GPRS Support Node (GGSN)—The Gateway GPRS Support Node (GGSN) is a main component of the GPRS network. The GGSN is responsible for the interworking between the GPRS network and external packet switched networks, like the Internet and X.25 networks. From an external network's point of view, the GGSN is a router to a sub-network, because the GGSN 'hides' the GPRS infrastructure from the external packet switched network. The GGSN may perform a network address translation (NAT) process which may corrupt address information about various entities of the RAN (or those which are coupled to the RAN) that participate in this exchange of information.

When the GGSN receives data addressed to a specific user, it checks if the user is active. If it is, the GGSN forwards the data to the SGSN serving the mobile user, but if the mobile user is inactive, the data is discarded. On the other hand, mobile-originated packets are routed to the right network by the GGSN. The GGSN is the anchor point that enables the mobility of the user terminal in the GPRS/UMTS networks. In essence, it carries out the role in GPRS equivalent to the Home Agent in Mobile IP. It maintains routing necessary to tunnel the Protocol Data Units (PDUs) to the SGSN that service a particular MS (Mobile Station).

The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the GSM address of the destination user. The readdressed packets are sent to the responsible SGSN. For this purpose, the GGSN stores the current SGSN address of the user and his or her profile in its location register. The GGSN is responsible for IP address assignment and is the default router for the coupled user equipment (UE). The GGSN also performs authentication and charging functions. Other functions include subscriber screening, IP Pool management and address mapping, QoS and PDP context enforcement. With LTE scenario the GGSN functionality moves to SAE gateway (with SGSN functionality working in MME).

Serving GPRS Support Node (SGSN)—a Serving GPRS Support Node (SGSN) is responsible for the delivery of data packets from and to the mobile stations within its geographical service area. Its tasks include packet routing and transfer, mobility management (attach/detach and location management), logical link management, and authentication and charging functions. The location register of the SGSN stores location information (e.g., current cell, current VLR) and user profiles (e.g., IMSI, address or addresses) used in the packet data network) of all GPRS users registered with this SGSN components.

Radio Network Controller (RNC)—the RNC is a governing element in the UMTS radio access network (UTRAN) and is responsible for controlling the Node Bs that are coupled to it. The RNC carries out radio resource management, some of the mobility management functions and is the point where encryption is done before user data is sent to and from the mobile. The RNC connects to the Circuit Switched Core Network through Media Gateway (MGW) and to the SGSN (Serving GPRS Support Node) in the Packet Switched Core Network. The logical connections between the network elements are known as interfaces.

The interface between the RNC and the Circuit Switched Core Network (CS-CN) is called Iu-CS and between the RNC and the Packet Switched Core Network is called Iu-PS. Other interfaces include Iub (between the RNC and the Node B) and Iur (between RNCs in the same network). Iu interfaces carry user traffic (such as voice or data) as well as control information Iur interface is mainly needed for soft handovers involving 2 RNCs though not required as the absence of Iur will cause these handovers to become hard handovers . . . ub, Iu and Iur protocols all carry both user data and signaling (that is, control plane).

Signaling protocol responsible for the control of the Node B by the RNC is called NBAP (Node-B Application Part). NBAP is subdivided into Common and Dedicated NBAP (C-NBAP and D-NBAP), where Common NBAP controls overall Node B functionality and Dedicated NBAP controls separate cells or sectors of the Node B. NBAP is carried over Iub. In order for NBAP to handle common and dedicated procedures, it is divided into: NodeB Control Port (NCP) which handles common NBAP procedures and Communication Control Port (CCP) which handles dedicated NBAP procedures. Control plane protocol for the transport layer is called ALCAP (Access Link Control Application Protocol).

Basic functionality of ALCAP is multiplexing of different users onto one AAL2 transmission path using channel IDs (CIDs). ALCAP is carried over Iub and Iu-CS interfaces. Signaling protocol responsible for communication between RNC and the core network is called RANAP (Radio Access Network Application Part), and is carried over Iu interface. Signaling protocol responsible for communications between RNCs is called RNSAP (Radio Network Subsystem Application Part) and is carried on the Iur interface.

Fourth Generation (4G) Wireless Networks 4G networks can include a RAN that in turn may include components such as the enhanced Node B (eNodeB) that is the hardware that is coupled to the mobile phone network that communicates directly with mobile handsets.

4G networks can have a System Architecture Evolution (SAE) architecture. The SAE has a flat, all-IP architecture with separation of control plane and user plane traffic (www.wikipedia.org). The main component of the SAE architecture is the Evolved Core network (EPC), also known as SAE Core. The EPC will serve as equivalent of GPRS networks (via the Mobility Management Entity, Serving Gateway and PDN Gateway subcomponents).

FIG. 1 illustrates a prior art 4G network that is coupled to the Internet 230 and to a user equipment (UE) 210. It is noted that multiple UEs are coupled to the 4G network and are arranged in cells. The prior art 4G wireless network includes eNodeB 212, ePDG (Evolved Packet Data Gateway) 216, ANDSF (Access Network Discovery and Selection Function) 214, MME (Mobility Management Entity) 218, SGW (Serving Gateway) 220, HSS (Home Subscriber Server) 222 and PGW (PDN Gateway) 224.

FIG. 1 illustrates UE 210 as being coupled to eNodeB 212 and to ePDG 216, eNodeB 212 and ePDG 216 as being coupled to SGW 220. PGW 224 as being coupled between SGW 220 and the Internet 230, and MME 218 as being coupled between HSS 222 and eNodeB 212.

MME 218 is the key control-node for the LTE access-network. It is responsible for idle mode UE (User Equipment) tracking and paging procedure including retransmissions. It is involved in the bearer activation/deactivation process and is also responsible for choosing the SGW 220 for a UE at the initial attach and at time of intra-LTE handover involving Core Network (CN) node relocation. It is responsible for authenticating the user (by interacting with the HSS).

The Non Access Stratum (NAS) signaling terminates at the MME 218 and it is also responsible for generation and allocation of temporary identities to UEs. It checks the authorization of the UE to camp on the service provider's Public Land Mobile Network (PLMN) and enforces UE roaming restrictions. The MME 218 is the termination point in the network for ciphering/integrity protection for NAS signaling and handles the security key management. Lawful interception of signaling is also supported by the MME 218. The MME 218 also provides the control plane function for mobility between LTE and 2G/3G access networks with the S3 interface terminating at the MME 218 from the SGSN. The MME 218 also terminates the S6a interface towards the home HSS 222 for roaming UEs.

SGW 220 routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PGW 224). For idle state UEs, the SGW 220 terminates the DL data path and triggers paging when DL data arrives for the UE. It manages and stores UE contexts, e.g. parameters of the IP bearer service, network internal routing information. It also performs replication of the user traffic in case of lawful interception.

PGW 224 provides connectivity from the UE to external packet switched networks by being the point of exit and entry of traffic for the UE. The PGW 224 can perform a NAT process that corrupts address information. A UE may have simultaneous connectivity with more than one PGW 224 for accessing multiple PDNs. The PGW 224 performs policy enforcement, packet filtering for each user, charging support, lawful Interception and packet screening. Another key role of the PGW 224 is to act as the anchor for mobility between 3GPP and non-3GPP technologies such as WiMAX and 3GPP2 (CDMA 1× and EvDO).

HSS 222 is a central database that contains user-related and subscription-related information. The functions of the HSS 222 include functionalities such as mobility management, call and session establishment support, user authentication and access authorization. The HSS is based on pre-Rel-4 Home Location Register (HLR) and Authentication Center (AuC).

ANDSF 214 provides information to the UE about connectivity to 3GPP and non-3GPP access networks (such as Wi-Fi). The purpose of the ANDSF 214 is to assist the UE to discover the access networks in their vicinity and to provide rules (policies) to prioritize and manage connections to these networks.

ePDG 216—the main function of the ePDG 216 is to secure the data transmission with a UE coupled to the EPC over an untrusted non-3GPP access. For this purpose, the ePDG 216 acts as a termination node of IPsec tunnels established with the UE.

Non Access Stratum (NAS) Protocols—The non-access stratum (NAS) protocols form the highest stratum of the control plane between the user equipment (UE) and MME. NAS protocols support the mobility of the UE and the session management procedures to establish and maintain IP connectivity between the UE and a PDN GW. They define the rules for a mapping between parameters during inter-system mobility with 3G networks. They also provide the NAS security by integrity protection and ciphering of NAS signaling messages. EPS provides the subscriber with a "ready-to-use" IP connectivity and an "always-on" experience by linking between mobility management and session management procedures during the UE attach procedure Complete NAS transactions consist of specific sequences of elementary procedures with EPS Mobility Management (EMM) and EPS Session Management (ESM) protocols.

The MME protocol stack consists of S1-MME stack to support S1-MME interface with eNodeB 212 and S11 stack to support S11 interface with Serving Gateway. MME 218 supports the S1 interface with eNodeB 212. The integrated S1 MME interface stack consists of IP, SCTP and S1AP.

SCTP (Stream Control Transmission Protocol) is a common transport protocol that uses the services of Internet Protocol (IP) to provide a reliable datagram delivery service to the adaptation modules, such as the S1AP. SCTP provides reliable and sequenced delivery on top of the existing IP framework. The main features provided by SCTP are (A) association setup: An association is a connection that is set up between two endpoints for data transfer, much like a TCP connection. A SCTP association can have multiple addresses at each end. (B) Reliable Data Delivery: Delivers sequenced data in a stream (Elimination of head-of-line blocking): SCTP ensures the sequenced delivery of data with multiple unidirectional streams, without blocking the chunks of data in other direction.

S1AP (S1 Application Part) is the signaling service between E-UTRAN and the Evolved Core network (EPC) that fulfills the S1 Interface functions such as SAE Bearer management functions, Initial context transfer function, Mobility functions for UE, Paging, Reset functionality, NAS signaling transport function, Error reporting, UE context release function, Status transfer. MME S11 Interface support MME supports S11 interface with Serving Gateway. The integrated S11 interface stack consists of IP, UDP and eGTP-C.

SGW (Serving Gateway) protocol includes: S11 control plane stack to support S11 interface with MME, S5/S8 control and data plane stacks to support S5/S8 interface with PGW, S1 data plane stack to support S1 user plane interface with eNodeB, and S4 data plane stack to support S4 user plane interface between RNC of UMTS and SGW of eNodeB.

SGW supports S11 interface with MME and S5/S8 interface with PGW. The integrated control plane stack for these interfaces consists of IP, UDP and eGTP-C.

SGW supports the S1-U interface with eNodeB and S5/S8 data plane interface with PGW. The integrated data plane stack for these interfaces consists of IP, UDP, eGTP-U.

PGW (Packet Data Network Gateway) protocols include S5/S8 control and data plane stacks to support S5/S8 interface with SGW. PGW supports S5/S8 interface with Serving Gateway. The integrated control plane stack for the S5/S8 interfaces consists of IP, UDP, eGTP-C. The integrated data plane stack for the S5/S8 interface consists of IP, UDP, eGTP-U.

In existing 3G and 4G networks, none of the network elements have a good understanding of what is happening in the radio network. For example, there is no accurate picture of how many users are attached to a particular cell, how many users are active or idle, how saturated the cell is, etc.

Without this detailed understanding of the Radio Access Networks (RAN), any video or data optimization solutions are not efficient. In some cases, the optimization solutions can cause under utilization of the radio network or even worse, not address over utilization due to inaccurate modeling.

As indicated above, each of these 3G and 4G networks interfaces with a packet switched external network such as the Internet via a network address translator (NAT) that performs a NAT process that results in corrupting masking address information (or otherwise losing such address information) about entities of the RAN (or entities coupled to the RAN) that exchange information packets with the internet. A non limiting example of such a NAT process includes compressing a range of IP addresses to a much smaller range of IP addresses that may indicate to the packet switched external network that the information packet is associated with the RAN.

SUMMARY OF THE INVENTION

According to an embodiment of the invention a method may be provided for enforcing a policy on data plane traffic, the method may include receiving, by a policy enforcer and from a probe, a first signature and first control metadata. the first control metadata may be indicative of at least one control plane message that was exchanged between a radio access network (RAN) and a core network and was intercepted by the probe. the at least one control plane message relates to a first entity that either belongs to the RAN or may be coupled to the RAN processing information packets received by the policy enforcer to provide information packet signatures. the information packets undergone an address translation process before being received by the policy enforcer and enforcing, by the policy enforcer, a policy associated with the first entity. the enforcing affects an information packet that may be associated with an information packet signature that equals the first signature. the address translation process does not corrupt the first signature.

The receiving of the first signature may be preceded by receiving an information packet that may be associated with an information packet that equals the first signature. the method may include storing the information packet until receiving the first signature.

The method may include delaying the enforcing of the policy associated with the first entity until receiving the first signature.

The first entity may be a user device.

The first entity may be a RAN cell.

The enforcing may include applying a rate shaping algorithm.

The state of the first entity may be affected by a state of a second entity. The method may include: receiving, by the policy enforcer and from the probe, a second signature and second control metadata. the second control metadata may be indicative of at least one control plane message that was exchanged between the RAN and the core network and was intercepted by the probe. the at least one control plane message relates to the second entity, the second entity either belongs to the RAN or may be coupled to the RAN and enforcing, by the policy enforcer, the policy associated with the first entity, the enforcing affects an information packet that may be associated with an information packet signature that equals the second signature.

The first entity may be a user device and the second entity may be a RAN cell.

The first and second entities belong to a same cell of the RAN.

The first and second entities belong to different cells of the RAN.

The signature has a predetermined lifespan and the method may include ignoring the signature after the duration of the lifespan expired.

The method may include determining, by the policy enforcer, a current state of the RAN based on control plane messages intercepted by the probe.

The determining of the current state may include determining bandwidth utilization in the RAN.

The core network may be a General Packet Radio Service (GPRS) network. The first control metadata may be indicative of at least one control plane message that was exchanged between a radio network controller (RNC) that may be arranged to control the RAN and a Service GPRS Support Node (SGSN) and intercepting control plane messages exchanged between user equipment (UE) and the SGSN.

The core network may include a Serving Gateway (SGW) and a Mobility Management Entity (MME). The RAN may include an enhanced node B (eNodeB) and the first control metadata may be indicative of at least one control plane message that was exchanged between the eNodeB and the MME.

The core network may include a Serving Gateway (SGW) and a Mobility Management Entity (MME). The RAN may include an enhanced node B (eNodeB) and the first control metadata may be indicative of at least one control plane message that was exchanged between user equipment (UE) and the MME.

The core network may be a code divisional multiple access (CDMA) network that may include a Packet Data Serving Node (PDSN) and a Packet Control Function (PCF) that may be coupled to a base station controller (BSC) and. the first control metadata may be indicative of at least one control plane message that was exchanged between at least two entities out of the PCF, the PDSN and the BSC.

The method may include receiving by the probe information packets that were sent from the policy enforcer.

Further embodiments of the invention include a computer readable medium that is non-transitory and may store instructions for performing above described methods and any steps thereof, including any combinations of same.

For example, the computer readable medium may store instructions for execution by one or more processors or similar devices, which instructions, when executed, result in, cause or facilitate receiving a first signature and first control metadata; wherein the first control metadata is indicative of at least one control plane message that was exchanged between a radio access network (RAN) and a core network and was intercepted by the probe; wherein the at least one control plane message relates to a first entity that either belongs to the RAN or is coupled to the RAN; processing information packets received by the policy enforcer to provide information packet signatures, wherein the information packets undergone an address translation process before being received by the policy enforcer; and enforcing a policy associated with the first entity, wherein the enforcing affects an information packet that is associated with an information packet signature that equals the first signature; wherein the address translation process does no corrupt the first signature.

Additional embodiments of the invention include a policy enforcer arranged to execute any or all of the methods described above, including any stages and any combinations of same.

For example, the policy enforcer may include: an interface, arranged to receive a first signature and first control metadata; wherein the first control metadata is indicative of at least one control plane message that was exchanged between a radio access network (RAN) and a core network and was intercepted by the probe; wherein the at least one control plane message relates to a first entity that either belongs to the RAN or is coupled to the RAN; a signature generator arranged to process information packets received by the policy enforcer to provide information packet signatures, wherein the information packets undergone an address translation process before being received by the policy enforcer; and a policy enforcing module arranged to enforce a policy associated with the first entity, wherein the enforcing affects an information packet that is associated with an information packet signature that equals the first signature; wherein the address translation process does no corrupt the first signature.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof may best be understood by reference to the following detailed description when read with the accompanying drawings in which:

Figure 1:
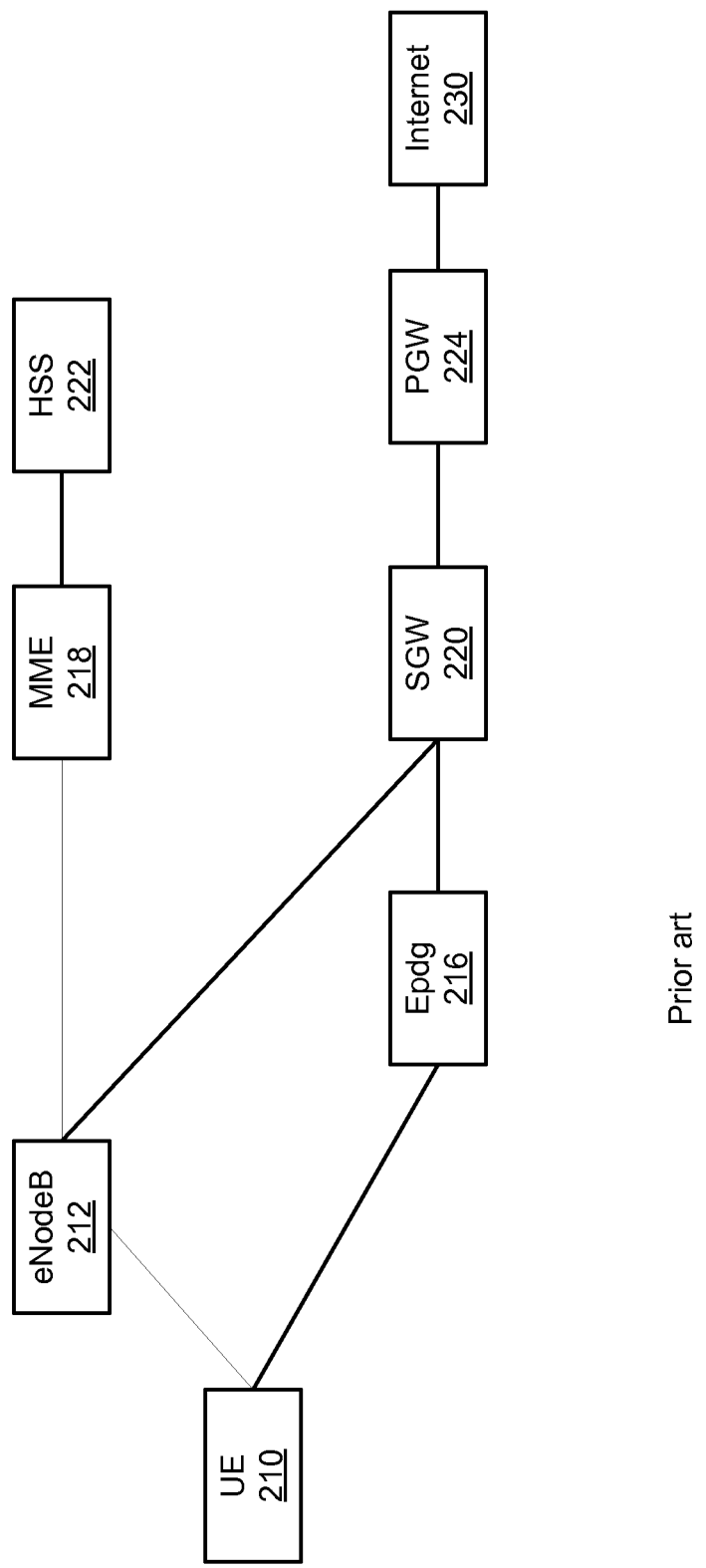
FIG. 1 illustrates a prior art 4G wireless network that is coupled to the Internet.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "modeling" can have its regular meaning and can be interpreted as including generation of information that represents a status of an entity. The status can reflect one or a plurality of parameters and their values. A model of an entity of a Radio Access Network can change over time.

The following abbreviations are being used:
APN Access Point Name
PE policy enforcer
BSC Base Station Controller
eNB eNodeB
GGSN Gateway GPRS Support Node
GPRS General Packet Radio Services
GTP GPRS Tunneling Protocol
IMEI International Mobile station Equipment Identity
IMSI International Mobile Subscriber Identity
ISDN Integrated Services Digital Network
MME Mobility Management Entity
MS Mobile Station
MSISDN MS international PSTN/ISDN number
NAS Non-Access Stratum
NAT Network address translator
NAT process network address translation process
NSAPI Network layer Service Access Point Identifier
PCF Packet Control Function
PDN Packet Data Network
PDSN Packet Data Serving Node
PE Policy enforcer.
P-GW PDN Gateway
PSTN Public Switched Telephone network
P-TMSI Pseudo Temporary Mobile Subscriber Identity
QoS Quality of Service
RAC Routing Area Code
RAN Radio Access Network
RANAP Radio Access Network Application Part
RNC Radio Network Controller
SGW Serving Gateway
SGSN Serving GPRS Support Node
TEID Tunnel End Point Identifier
UE User Equipment For simplicity of explanation the Internet is provided as an example of an external network. Any of the mentioned below networks can be associated with other external networks.

For brevity of explanation the various examples listed below refer to traffic that is sent from the RAN towards the Internet although any of the examples provided below are applicable to traffic that is sent from the Internet towards the RAN. Thus, a policy shaper can enforce a policy on information packets that are directed to the Internet and can enforce policy on information packets that are directed towards the RAN. The policy enforcer can generate a signature and send the signature to a probe and can also receive a signature generated by the probe.

The suggested systems, methods and computer program products allow to apply policies (such as bandwidth allocation policies, rate shaping) on information packets after performing a recovery from a NAT process that looses information about entities that belong to the RAN or are coupled to the RAN.

A probe and a policy enforcer are provided. They are logically located at different sides of a NAT—the address information the probe sees differs from the address information that the policy enforcer sees as a result of an appliance of a NAT process on the information address.

The probe can intercept control plane messages that relate to entities of the RAN or to entities that are coupled to the RAN. The probe can generate a signature that is sent to the policy enforcer. It is expected that data plane messages (information packets) that are sent from these entities will include that signature.

The signature is designed such as to withstand the NAT process—not to be changed during the NAT process or to be changed in a manner that does not effect the detection of the signature.

The signature can include predefined information packet fields or a result of a processing operation (such as hash) applied on these predefined information packet fields.

The signature can be associated with a lifespan in order to reduce the probability that two information packets related to different entities will have the same signature. Non-limiting examples of a lifespan can include one or few seconds.

The signature can be responsive to UDP checksum field, TCP checksum field, IP destination address, IP source address, payload portions and the like.

The selection of fields is made in response to the NAT process- to make sure that the signature does not change due to the NAT process.

The policy enforcer can enforce a policy on information packets that are identified by their signature based on the policy rules and the status of the RAN (or any information included in the control metadata).

The disclosed systems, computer program products and methods may not disrupt existing network elements in the core network and in the radio network. The policy enforcer and the probe may be transparent to the existing network elements. The existing network elements do not have to be upgraded.

According to various embodiments of the invention a system can be provided and may include (a) a probe, arranged to intercept control plane messages that are exchanged between a Radio Access Network (RAN) and a core network that is coupled to the RAN; and (b) a policy enforcer arranged to determine a current state of the RAN based on the control plane messages.

It is noted that the proposed systems and methods are applicable to various types of networks, and especially both 3G and 4G networks. In case of 3G networks, the probe can be placed between the Radio Network Controller (RNC) and the Serving GPRS Support Node (SGSN). The interface between the RNC and the SGSN is referred to as the IuPS interface. The probe may parse all IuPS signaling messages between the RNC and the SGSN. This includes RANAP protocol messages between the SGSN and the RNC and the NAS signaling messages between the SGSN and the end User Equipment (UE).

Figure 2:
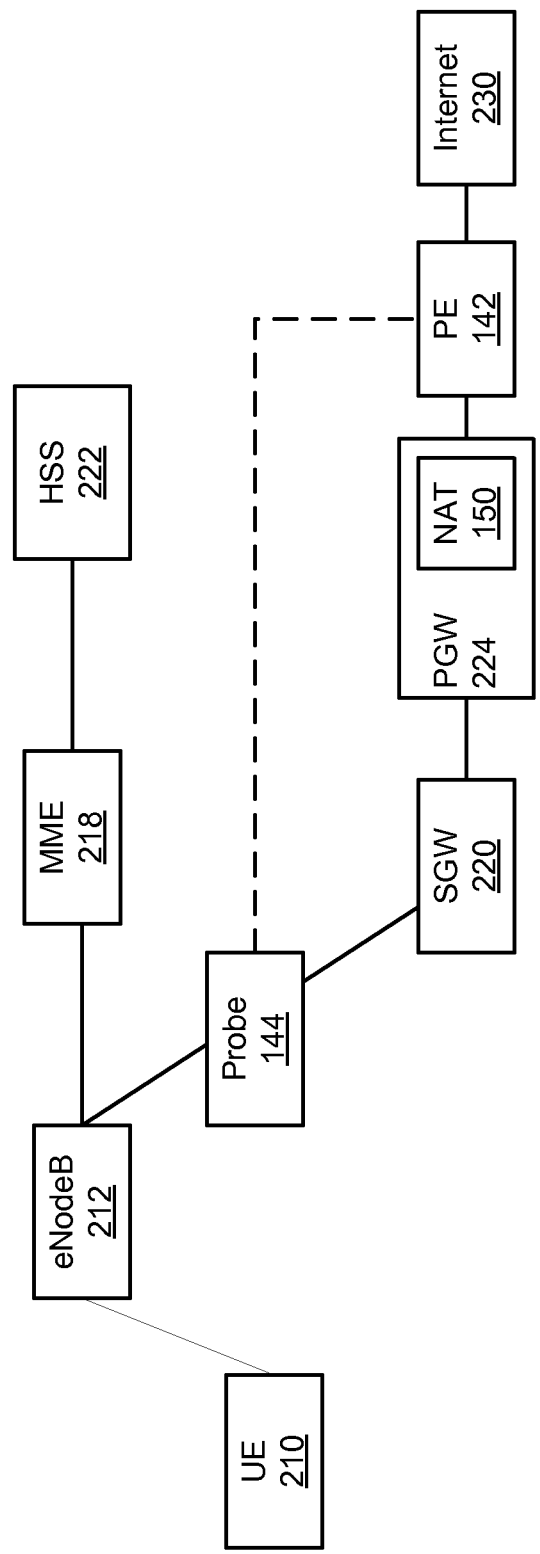
FIG. 2 illustrates a system and its environment according to an embodiment of the invention.

FIG. 2 illustrates probe 144 as being positioned between the eNodeB 212 and the GSW 220.

The probe 144 can be coupled to between any of the following entities: eNodeB and UE 210, eNodeB and MME 218, SGW 220 and PGW 220. The PGW 224 includes NAT 150. Data is usually conveyed between the SGW 220, PGW 224 while voice is conveyed over the MME 218 and the HSS 222. The location of the probe can determine which kind of traffic is monitored.

The probe 144 can be placed closer to either the core network nodes like the MME 218 and the SGW 220 or closer to the eNodeB 212. Additionally, the probe can be implemented within these devices.

The probe 144 parses the S1 messages between the eNodeB 212 and the core network. This includes S1-AP messages between the MME 218 and the eNodeB 212, and the NAS signaling messages between the MME 218 and the UE 210.

The UE 210 is also sometimes called the Mobile Station (MS). It can be any device (including cell phones, laptop modems) that can attach to a 3G or a 4G network.

Figure 3:
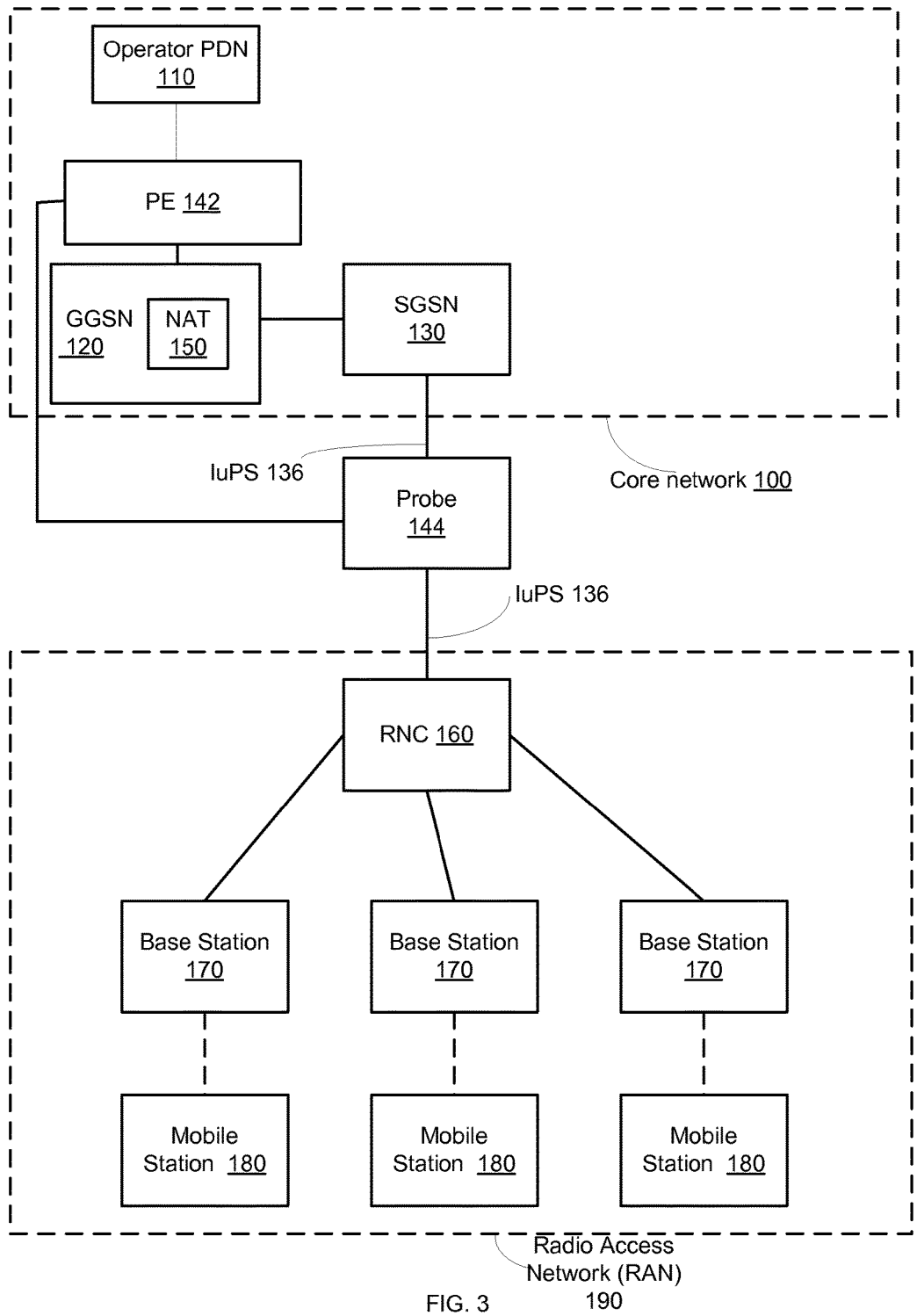
FIG. 3 illustrates a system and its environment according to an embodiment of the invention.

FIG. 3 illustrates policy enforcer (PE) 142, a probe 144, a core network 100 and RAN 190 according to an embodiment of the invention.

The probe 144 may intercept control plane messages.

The PE 142 may process control metadata from the probe and apply a policy on information packets based on their signatures. The PE 142 may also evaluate to state of the RAN.

The probe 144 is illustrated as being coupled to IuPS 136 interfaces.

It is noted that the probe 144 may also track after user data sessions and that PE 142 can also perform various operations in response to the state of the RAN, such as congestion estimation, congestion prevention, and the like.

The PE 142 may enforce bandwidth management decisions it makes. For example, the PE 142 can model the RAN, and in response to the model it can allocate a target bit rate for each application session. The PE 142 can receive information about the status of the RAN from another entity (not shown) and may process this information and, additionally or alternatively send the information to the PE.

The PE 142 then tries to enforce the bit rate for the application session using various techniques. The technique used depends on the type of application session. The PE 142 may control the bit rate on both directions—uplink and downlink. Thus, a stream that is intended to be provided from the core network to the RAN can be compressed, delayed, statistically multiplexed with other streams before it passes towards the RAN. The same applies to streams that are sent from the RAN to the core network.

Additionally or alternatively, the PE 142 can send bit rate allocation values to entities of the core network and/or to entities of the RAN and request these entities to enforce these bit rate allocation values.

The core network 100 is illustrated as including an operator PDN 110 such as the Internet or a private packet data network, GGSN 120 and SGSN 130. The GGSN 120 is coupled between the operator PDN 110 and the SGSN 130.

The RAN 190 includes a RNC 160 that is coupled to multiple base stations 170 that in turn are wirelessly coupled to mobile stations 180.

The probe 144 can be placed closer to either the SGSN 130 or the RNC 160. There is no restriction on its physical placement. Additionally, the functions of the probe 144 can be implemented within the SGSN 130 or the RNC 160.

In the case of 4G networks, the probe 144 can be placed between the eNodeB, the MME/SGW (Serving Gateway).

According to such an embodiment of the invention, the probe 144 may perform part of the processing of the control plane messages, may assist in enforcing a policy, and may assist a modeling of the RAN. The probe 144 can even sent to the PE 142 instructions relating to an enforcement of policy—such as policy enforcing parameters, which policy to enforce and the like.

The probe 144 can parse all signaling messages between the RAN 190 and the core network and provides a summary of the RAN conditions to the PE 142. It is also possible for the probe 144 to just forward a copy of all control plane messages to the PE 142. In this case, the control plane messages are actually processed on the PE 142 to enforce policies and additionally or alternatively to model the RAN 190 and the probe 144 does not process these messages. In case of 4G networks, the PE 142 can be placed on the SGi interface between the PGW and the operator services/Internet with the probe 144 on the S1 interface.

When the probe 144 is placed on the interface between the RAN and the core network, it can be placed either close to the core network nodes like the SGSN, SGW or MME or closer to the RAN network. It can also be placed inside the RAN network between the base stations and the RNC.

Figure 4:
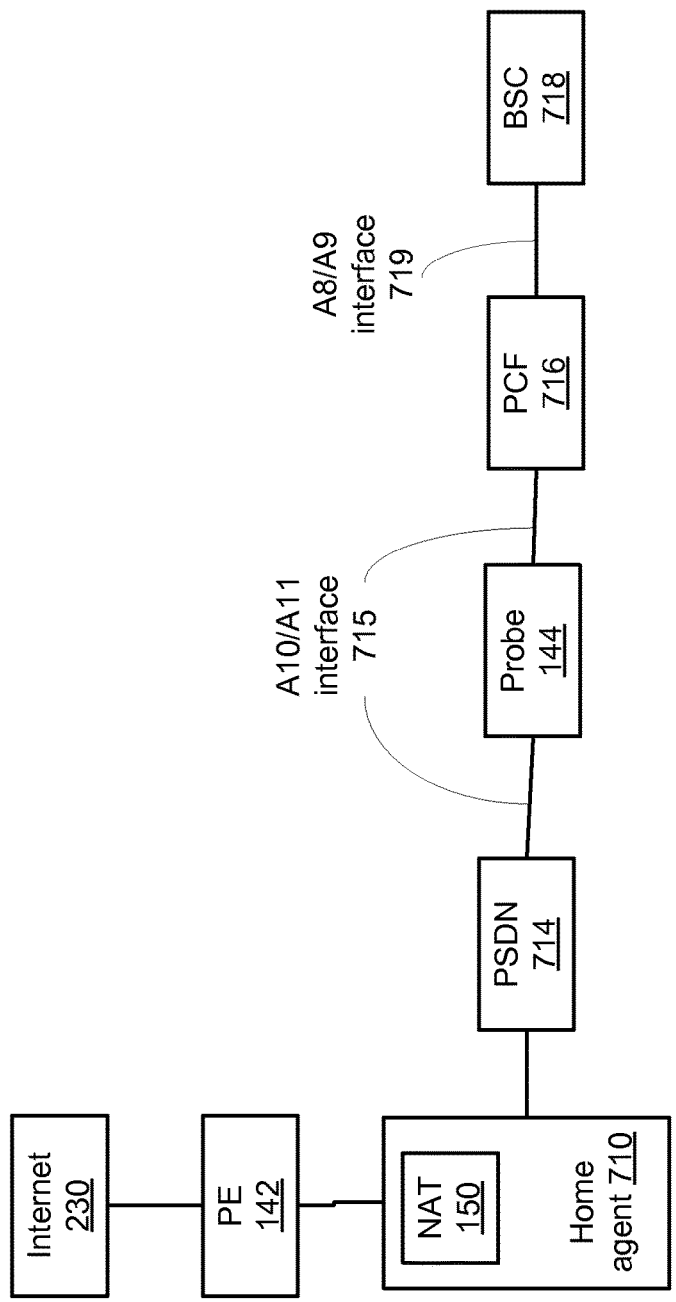
FIG. 4 illustrates a system and its environment according to an embodiment of the invention.
Figure 5:
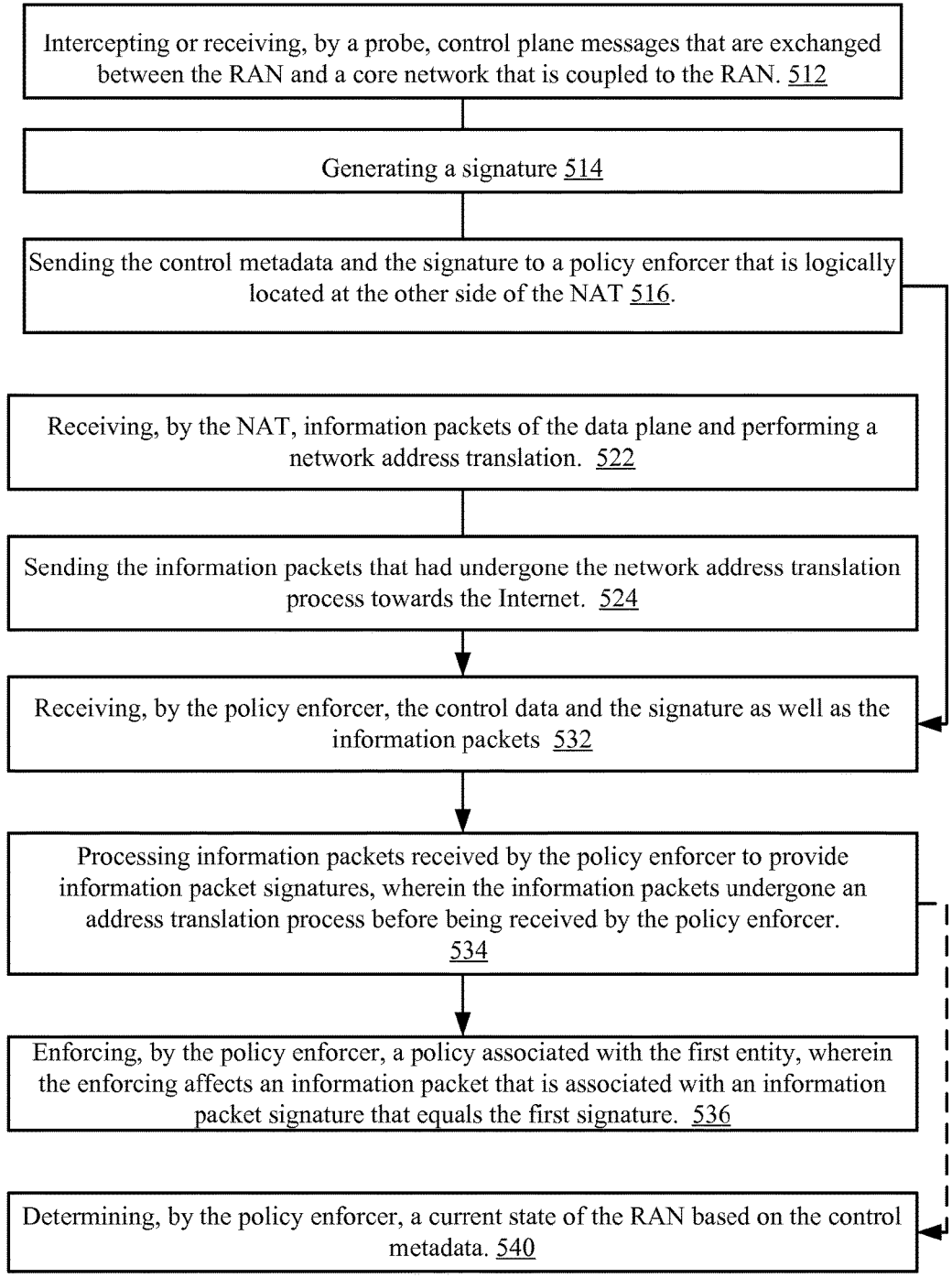
FIG. 5 illustrates a method according to an embodiment of the invention.

FIG. 4 illustrates the PE 142 and the probe 144 142 in various CDMA 3G networks, according to various embodiments of the invention.

The CDMA 3G network includes a Base Station Controller (BSC) 718, a Packet Control Function (PCF) 716, a Packet Data Serving Node (PDSN) 714 and a home agent 710. The NAT 150 is located at the home agent 710. The PE 142 is coupled between the home agent 710 and the Internet 230.

The probe 144 can be placed on the A10/A11 interface between the PCF 716 and the PDSN 714. The probe 144 may parse all the A11 control plane messages exchanged between the PCF 716 and the PDSN 714 to model the RAN that includes the BSC 718 and the base stations controlled by the BSC.

It is noted that the probe can be placed on the A8/A9 interface between the BSC 718 and the PCF 716. The probe may parse the A9 control plane messages exchanged between the BSC 718 and the PCF 716.

Figure 6:
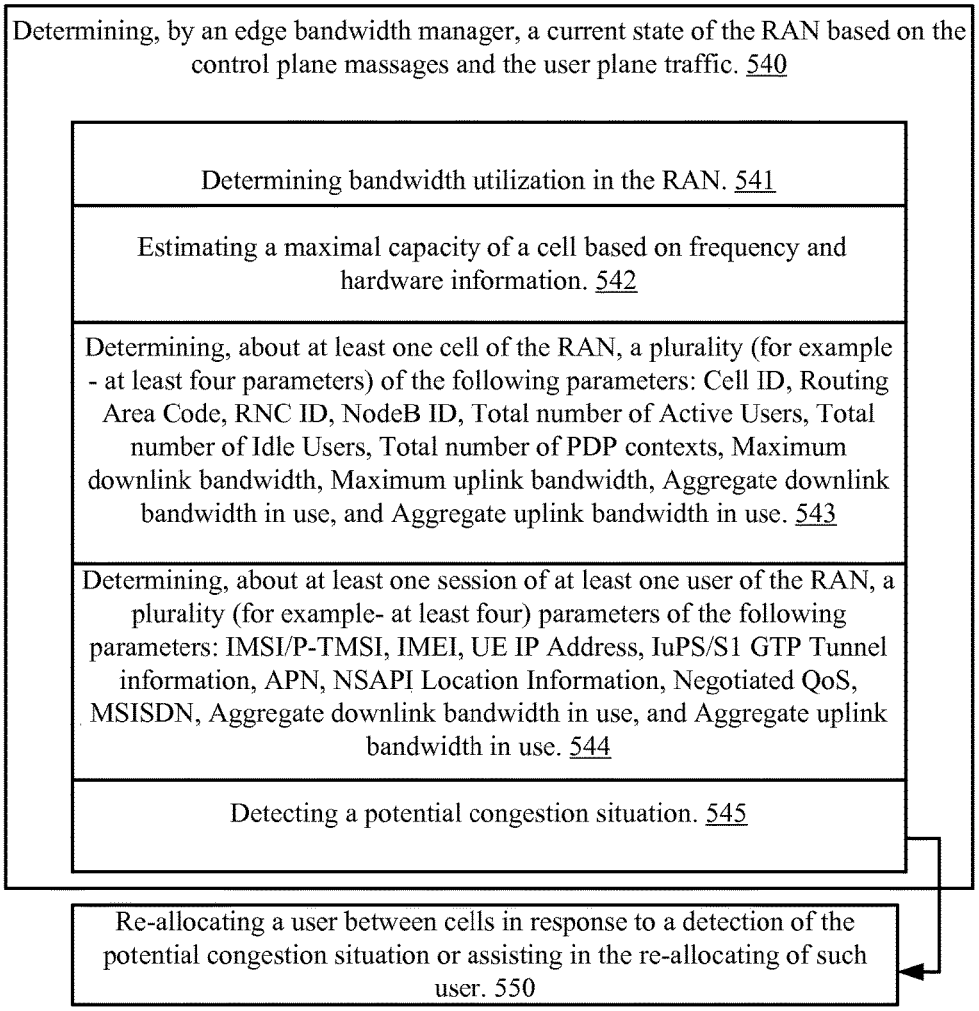
FIG. 6 illustrates a method according to an embodiment of the invention.

FIG. 6 illustrates method 500 according to an embodiment of the invention.

Method 500 may include various stages that can be executed by different entities. For example, the sequence of stages 512, 514 and 516 are executed by a probe. The sequence of stages 522 and 524 may be executed by the NAT. The Sequence of stages 532, 534, 536 and 540 can be executed by the policy enforcer.

Stage 512 may include intercepting or receiving, by a probe, control plane messages that are exchanged between the RAN and a core network that is coupled to the RAN. The intercepting can be done in a non-intrusive manner in the sense that the control plane messages arrive to their intended destination without being changed.

Stage 514 may include generating a signature by the probe. The manner in which the signature is calculated (which fields, which function to apply) is predetermined in advance so that the probe and the policy enforcer can apply the same signature processing process.

Stage 516 may include sending the control metadata and the signature to a policy enforcer that is logically located at the other side of the NAT.

Stage 522 may include receiving, by the NAT, information packets of the data plane and performing a network address translation.

Stage 524 may include sending the information packets that had undergone the network address translation process towards the Internet.

Stages 524 and 516 may be followed by stage 532 of receiving, by the policy enforcer, the control data and the signature as well as the information packets. If the information packets are received before the signature then they can be temporarily by the policy enforced and not sent towards the Internet until the signature is received.

Stage 532 is followed by stage 534 of processing information packets received by the policy enforcer to provide information packet signatures, wherein the information packets undergone an address translation process before being received by the policy enforcer.

Stage 534 may be followed by stage 536 of enforcing, by the policy enforcer, a policy associated with the first entity, wherein the enforcing affects an information packet that is associated with an information packet signature that equals the first signature.

Stage 534 may also be followed by stage 540 of determining, by the policy enforcer, a current state of the RAN based on the control metadata.

It is noted that the method can be applied to traffic that flows at the other direction.

Figure 7:
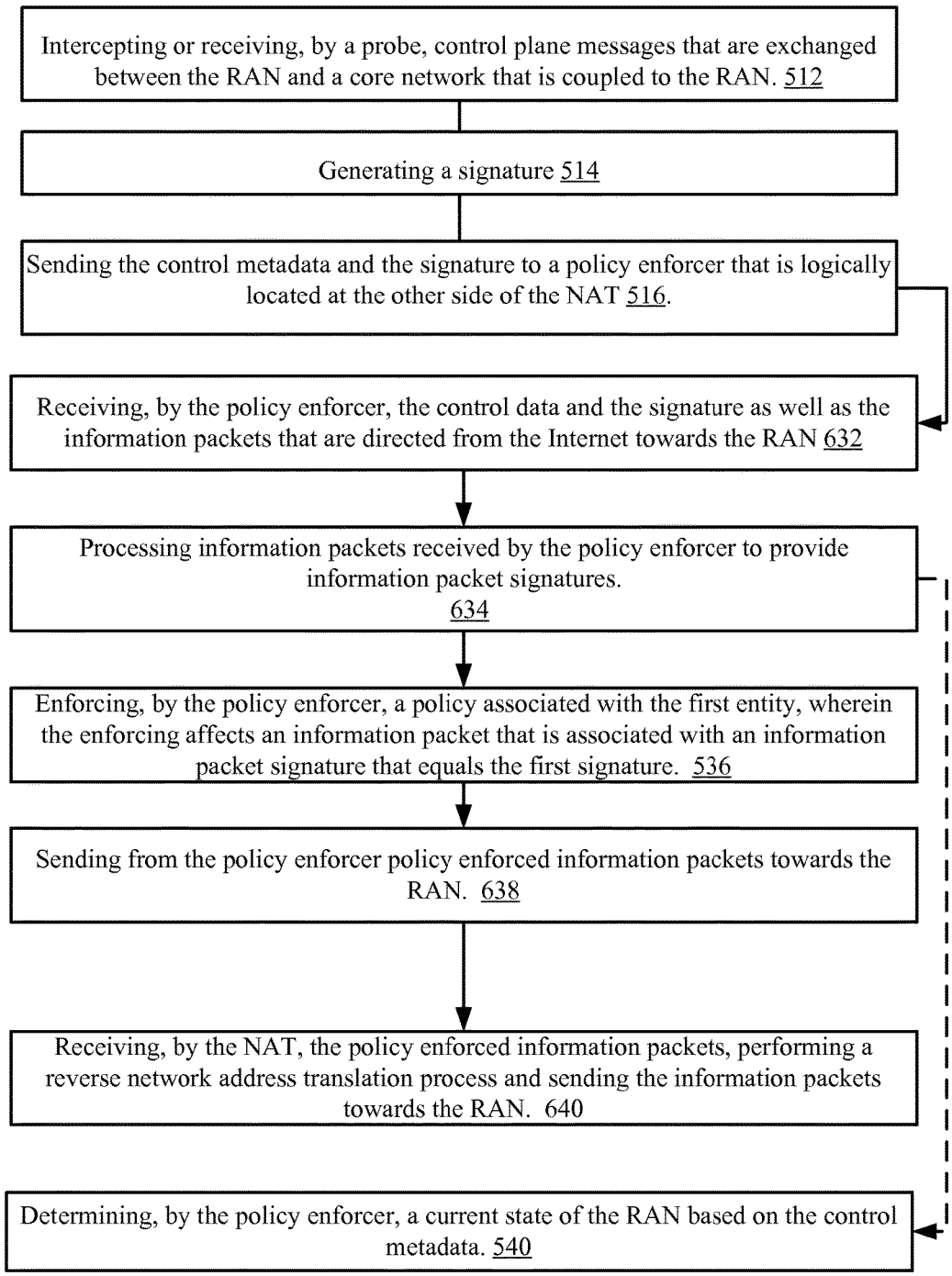
FIG. 7 illustrates a method according to an embodiment of the invention.

FIG. 7 illustrates method 700 according to an embodiment of the invention.

Method 700 may include various stages that can be executed by different entities. For example, the sequence of stages 512, 514 and 516 are executed by a probe. Stages 640 may be executed by the NAT. The Sequence of stages 632, 634, 536, 638 and 540 can be executed by the policy enforcer.

Stage 512 may include intercepting or receiving, by a probe, control plane messages that are exchanged between the RAN and a core network that is coupled to the RAN. The intercepting can be done in a non-intrusive manner in the sense that the control plane messages arrive to their intended destination without being changed.

Stage 514 may include generating a signature by the probe. The manner in which the signature is calculated (which fields, which function to apply) is predetermined in advance so that the probe and the policy enforcer can apply the same signature processing process.

Stage 516 may include sending the control metadata and the signature to a policy enforcer that is logically located at the other side of the NAT.

Stage 516 may be followed by stage 632 of receiving, by the policy enforcer, the control data and the signature as well as information packets that are directed from the Internet towards the RAN. If the information packets are received before the signature then they can be temporarily by the policy enforcer and are not sent towards the RAN until the signature is received.

Stage 632 is followed by stage 634 of processing information packets received by the policy enforcer to provide information packet signatures.

Stage 634 may be followed by stage 536 of enforcing, by the policy enforcer, a policy associated with the first entity, wherein the enforcing affects an information packet that is associated with an information packet signature that equals the first signature.

Stage 634 may also be followed by stage 540 of determining, by the policy enforcer, a current state of the RAN based on the control metadata.

Stage 536 may be followed by stage 638 of sending from the policy enforcer policy enforced information packets towards the RAN.

Stage 638 may be followed by stage 640 of receiving, by the NAT, the policy enforced information packets, performing a reverse network address translation process and sending the information packets towards the RAN.

Modeling the RAN

According to another embodiment of the invention the probe may also monitor user plane traffic, both uplink and downlink, between the RAN and the core network and the PE 144 may model the RAN to determine the status of the RAN. The modeling may assist in policy enforcement decisions as policies that may be responsive to the state of the RAN can be more effective that those which ignore the status of the RAN.

The probe can process information (such as control plane messages) to determine the status of the RAN and may, additionally or alternatively, receive RAN status information from another entity.

In case of 3G networks, the probe 144 may also monitor the user plane traffic on the Iu-U interface between the RNC and the SGSN or between RNC and the GGSN, in case Direct Tunnel architecture is used. In case of 4G networks, the probe may also monitor the user plane traffic on the S1-U interface between the eNodeB and the Serving Gateway.

The PE 142 at any time may maintain an accurate picture of the RAN. On a per radio cell basis, it maintains the following information.

Cell Information: Cell ID, Routing Area Code, RNC ID, eNodeB ID, Total number of Active Users, Total number of Idle Users, Total number of PDP contexts, Maximum downlink bandwidth, Maximum uplink bandwidth, Aggregate downlink bandwidth in use, and Aggregate uplink bandwidth in use.

Each piece of information described above may be obtained by parsing the relevant control plane messages and the data plane traffic. For example, in a 3G GSM network, the Cell ID is obtained from the NAS and RANAP messages exchanged on the IuPS interface. The number of active and idle users in a cell is determined based on observing state transitions for each UE in the cell. The bandwidth consumption parameters, is determined by parsing the data plane and figuring out how much bandwidth is being consumed at any point.

A per-radio cell information such as the one described above may be used by the PE to figure out how much additional capacity is available in the cell. The radio cell is also called a "Sector". Note that "Cell" and "Sector" are used interchangeably in this document.

A typical base station configuration has three sectors. Six sectors per base station is also possible. It also allows the PE to predict congestion situations and take corrective actions, thereby preventing congestion in a particular cell. In addition, the information present in the table above can be used to move certain users from a cell which is saturated to another cell that is underutilized, if the user is a location where the two cells overlap.

The per-cell information may be is constantly updated in real-time based on the mobility and other signaling between the RAN and the core network and the data traffic consumed by the users. The per-cell information listed above is not exhaustive.

The PE may also maintains the user session state that may include at least some (or all) of the following parameters: International Mobile Subscriber Identity (IMSI); Pseudo Temporary Mobile Subscriber Identity (P-TMSI); International Mobile station Equipment Identity (IMEI); User Equipment (UE) Internet Protocol (IP) address; Access Point Name (APN); Network layer Service Access Point Identifier (NSAPI) location information; negotiated quality of service (QoS); Mobile Station international Public Switched Telephone Network (PSTN) or Integrated Services Digital Network (ISDN) number; General Packet Radio Services Tunneling Protocol (GPRS) tunnel information; aggregate downlink bandwidth in use and aggregate uplink bandwidth in use.

Each piece of information described in the previous paragraph may be obtained by parsing the relevant control plane messages and the traffic generated by the user. For example, in a 3G GSM network, the subscriber IMSI is obtained by parsing the Attach Request NAS message from the UE to the SGSN. Another example is the APN information that is obtained from the Activate PDP Context Request NAS message sent from the UE to the SGSN.

Per-session information may be is constantly updated in real-time based on the mobility and other signaling between the RAN and the core network and the data traffic consumed by each session. The information listed above is not exhaustive.

As mentioned previously, the PE constructs per-cell and per-cell information (e.g. as described in Tables 1 and 2) by processing control and user plane traffic between the RAN and the core network.

The following describes in more details a method for constructing this information, according to an embodiment of the invention.

1. When the UE is powered on, it attaches to an SGSN. One of the first messages it sends is the Attach Request message. The subscriber identity and the location information are available in the Attach Request Message.
2. There are subsequent Identity Request and Check procedures, where the subscriber's actual IMSI and the IMEI information is obtained.
3. The session information is obtained when the subscriber sets up a session using the Activate PDP context procedure. This information obtained includes, the user's APN, NSAPI, requested QoS, UE IP address, and etc.,
4. The tunnel information for the GTP tunnel between the RNC and the SGSN is obtained by parsing the RANAP messages related to the RAB Assignment procedure. These messages are exchanged between the RNC and the SGSN.
5. The PE also parses messages related to the UE detaching or tearing down a session.

As users move around in the radio network, the PE keeps track of which cell each user is at any time, so that it knows accurately how many users are in a particular radio cell.

The following describes how the PE keeps track of mobility related information, according to an embodiment of the invention:

1. When the UE is about to move into a new routing area (tracking area in case of 4G networks), the probe parses all messages related to routing area update procedure. This allows the PE to figure out which cell the user is moving in to at any time. This also allows the PE to keep track of the current cell the UE is in at any time.
2. When the UE is about to move in to a new location that results in a change of RNC, the probe parses all inter-RNC handover messages. This allows the PE to get updated GTP tunnel information and information exchanged between the source RNC and the target RNC.
3. The probe also parses handover messages related to inter-eNodeB handovers, so that it has the current routing area and cell information.
4. The PE may also processes all messages related to location reporting between the RNC and the SGSN.

In addition to processing the control plane messages, the PE may also monitor how much data traffic (both downlink and uplink) is being sent/consumed by each user on the user plane. By mapping each user's session to a cell, and the downlink and uplink bandwidth associated with each session, the policy enforcers computes the aggregate bandwidth that is being consumed at any time for each cell.

The maximum bandwidth available per cell is configured on the PE on a per-cell basis. There are a couple of alternate options instead of having to configure the PE on a per-cell basis. In the first option, the PE obtains this information from a central database through LDAP or similar mechanism. The central database has information on how much total bandwidth is available per cell. In the second option, the PE obtains information about the base station, more specifically what frequency it is configured with, how many antennas are installed, etc., and then figures out the total bandwidth available on the cell based on the base station information. The frequency range, and the antenna configuration is used by the PE to figure out the maximum bandwidth available per cell. Based on the total bandwidth available in a cell and the current bandwidth consumption in the cell, the PE figures out if a particular cell is saturated or underutilized.

By looking at the mobility patterns, the PE is also able to predict congestion in a cell before it happens. For example, when it sees a number of users being handed over from one cell to another, it can predict the impact on the target cell before the users move to the target cell. Based on the impact to the target cell, the PE can start taking corrective actions before the handover event happens. This allows the PE to predict congestion and prevent it before it happens in any particular cell. Another example is based on idle to active mode transitions. When the PE sees a user or a number of users transitioning from the idle to active mode, it can predict the impact of the new sessions on the cell and start taking corrective actions if it predicts congestion on the cell.

For 4G networks, the PE may process the messages corresponding to NAS attach procedure, identity request procedure, S1 GTP tunnel setup messages, inter-eNodeB handovers and tracking area update procedures. This is very similar to what is described above in 3G.

FIG. 6 illustrates stage 540 and 550 of method 500 according to an embodiment of the invention.

Stage 540 may include determining, by an policy enforcer, a current state of the RAN based on the control plane messages and the user plane traffic.

Stage 540 may include stage 541 of determining bandwidth utilization in the RAN.

Stage 541 may include determining the aggregate bandwidth, the available bandwidth or any bandwidth statistics per RAN, per cell, per session, per a group of users and the like.

Stage 540 may include stage 542 of estimating a maximal capacity of a cell based on frequency and hardware information.

Stage 540 may include stage 543 of determining of the current state of the RAN comprises determining, about at least one cell of the RAN, a plurality (for example—at least four parameters) of the following parameters: Cell ID, Routing Area Code, RNC ID, NodeB ID, Total number of Active Users, Total number of Idle Users, Total number of PDP contexts, Maximum downlink bandwidth, Maximum uplink bandwidth, Aggregate downlink bandwidth in use, and Aggregate uplink bandwidth in use.

Stage 540 may include stage 544 of determining, about at least one session of at least one user of the RAN, a plurality (for example—at least four) parameters of the following parameters: IMSI/P-TMSI, IMEI, UE IP Address, IuPS/S1 GTP Tunnel information, APN, NSAPI Location Information, Negotiated QoS, MSISDN, Aggregate downlink bandwidth in use, and Aggregate uplink bandwidth in use Stage 540 may include stage 545 of detecting a potential congestion situation.

Stage 545 may be followed by stage 640 of re-allocating a user between cells in response to a detection of the potential congestion situation or assisting in the re-allocating of such user. The re-allocating can include requesting a RAN entity (such as a controller) to perform the re-allocation.

According to an embodiment of the invention the probe can participate in the policy enforcing process. The probe can send instructions or recommendations to the PE, based on the control plane messages (or other information the probe obtains or receives).

According to an embodiment of the invention a computer program product is provided. The computer program product includes a non-transitory computer readable medium that may store instructions for executing any of the mentioned above methods.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for enforcing a policy on data plane traffic, the method comprising:
   receiving, by a policy enforcer and from a probe, a first signature and first control metadata; wherein the first control metadata is indicative of at least one control plane message that was exchanged between a radio access network (RAN) and a core network and was intercepted by the probe; wherein the at least one control plane message relates to a first entity that either belongs to the RAN or is coupled to the RAN; wherein the first signature has a predetermined lifespan and wherein the method comprises ignoring the first signature after a duration of the lifespan expired;
   processing information packets received by the policy enforcer to provide information packet signatures, wherein the information packets have undergone an address translation process before being received by the policy enforcer; and enforcing, by the policy enforcer with an assistance of the probe, a policy associated with the first entity, wherein the enforcing affects an information packet of the information packets that is associated with an information packet signature that equals the first signature; wherein the assistance of the probe in the enforcing of the policy associated with the first entity is executed in addition to sending by the probe and to the policy enforcer the first signature and the first control metadata;

wherein the address translation process when working correctly does not corrupt the first signature.

2. The method according to claim 1, wherein the receiving of the first signature is preceded by receiving the information packet of the information packets that is associated with the information packet signature that equals the first signature; wherein the method comprises storing the information packet until receiving the first signature.

3. The method according to claim 2, comprising delaying the enforcing of the policy associated with the first entity until receiving the first signature.

4. The method according to claim 1, wherein the first entity is a user device.

5. The method according to claim 1, wherein the first entity is a RAN cell.

6. The method according to claim 1, wherein the enforcing comprises applying a rate shaping algorithm.

7. The method according to claim 1, wherein a state of the first entity is affected by a state of a second entity; wherein the method comprises:

receiving, by the policy enforcer and from the probe, a second signature and second control metadata; wherein the second control metadata is indicative of at least one control plane message that was exchanged between the RAN and the core network and was intercepted by the probe; wherein the at least one control plane message relates to the second entity, the second entity either belongs to the RAN or is coupled to the RAN; and enforcing, by the policy enforcer, the policy associated with the first entity, wherein the enforcing affects an information packet that is associated with an information packet signature that equals the second signature.

8. The method according to claim 7, wherein the first entity is a user device and the second entity is a RAN cell.

9. The method according to claim 7, wherein the first and second entities belong to a same cell of the RAN.

10. The method according to claim 7, wherein the first and second entities belong to different cells of the RAN.

11. The method according to claim 1, comprising determining, by the policy enforcer, a current state of the RAN based on control plane messages intercepted by the probe.

12. The method according to claim 11, wherein the determining of the current state comprises determining bandwidth utilization in the RAN.

13. The method according to claim 11, wherein the core network is a General Packet Radio Service (GPRS) network; and wherein the first control metadata is indicative of at least one control plane message that was exchanged between a radio network controller (RNC) that is arranged to control the RAN and a Service GPRS Support Node (SGSN) and intercepting control plane messages exchanged between user equipment (UE) and the SGSN.

14. The method according to claim 11, wherein the core network comprises a Serving Gateway (SGW) and a Mobility Management Entity (MME), wherein the RAN comprises an enhanced node B (eNodeB); and wherein the first control metadata is indicative of at least one control plane message that was exchanged between the eNodeB and the MME.

15. The method according to claim 11, wherein the core network comprises a Serving Gateway (SGW) and a Mobility Management Entity (MME), wherein the RAN comprises an enhanced node B (eNodeB); and wherein the first control metadata is indicative of at least one control plane message that was exchanged between user equipment (UE) and the MME.

16. The method according to claim 11 wherein the core network is a code divisional multiple access (CDMA) network that comprises a Packet Data Serving Node (PDSN) and a Packet Control Function (PCF) that is coupled to a base station controller (BSC); and wherein the first control metadata is indicative of at least one control plane message that was exchanged between at least two entities out of the PCF, the PDSN and the BSC.

17. The method according to claim 1, comprising receiving by the probe information packets that were sent from the policy enforcer.

18. The method according to claim 1, wherein the assistance of the probe in the enforcing of the policy comprises sending to the policy enforcer instructions relating to the enforcing of the policy.

19. The method according to claim 18, wherein the instructions relating to the enforcing of the policy determine enforcing parameters.

20. The method according to claim 18, wherein the instructions relating to the enforcing of the policy determine which policy to enforce.

21. The method according to claim 1, comprising performing, by the probe, part of the processing of the control plane messages.

22. The method according to claim 1, wherein the processing of the information packets comprises applying a hash function on a checksum field of each of the information packets to provide information packet signatures.

23. A computer program product that comprises a non-transitory computer readable medium that stores instructions for:

receiving, by a policy enforcer and by from a probe, a first signature and first control metadata; wherein the first control metadata is indicative of at least one control plane message that was exchanged between a radio access network (RAN) and a core network and was intercepted by the probe; wherein the at least one control plane message relates to a first entity that either belongs to the RAN or is coupled to the RAN; wherein the first signature has a predetermined lifespan and wherein the wherein the non-transitory computer readable medium stores instructions for ignoring the first signature after a duration of the lifespan expired;

processing, by the policy enforcer, information packets received by the policy enforcer to provide information packet signatures, wherein the information packets have undergone an address translation process before being received by the policy enforcer; and enforcing by the policy enforcer and with an assistance of the probe, a policy associated with the first entity, wherein the enforcing affects an information packet that is associated with an information packet signature that equals the first signature; wherein the address translation process when working correctly does not corrupt the first signature; wherein the assistance of the probe in the enforcing of the policy associated with the first entity is executed in addition to sending by the probe and to the policy enforcer the first signature and the first control metadata.

24. The computer program product according to claim 23, wherein the receiving of the first signature is preceded by receiving the information packet of the information packets that is associated with the information packet signature that equals the first signature; wherein the non-transitory computer readable medium stores instructions for storing the information packet until receiving the first signature.

25. The computer program product according to claim 24, storing instructions for delaying the enforcing of the policy associated with the first entity until receiving the first signature.

26. The computer program product according to claim 23, wherein the first entity is a user device.

27. The computer program product according to claim 23, wherein the first entity is a RAN cell.

28. The computer program product according to claim 23, wherein the non-transitory computer readable medium stores instructions for enforcing the policy by applying a rate shaping algorithm.

29. The computer program product according to claim 23, wherein a state of the first entity is affected by a state of a second entity; wherein the non-transitory computer readable medium stores instructions for:
   receiving, by the policy enforcer and from the probe, a second signature and second control metadata; wherein the second control metadata is indicative of at least one control plane message that was exchanged between the RAN and the core network and was intercepted by the probe; wherein the at least one control plane message relates to the second entity, the second entity either belongs to the RAN or is coupled to the RAN; and
   enforcing the policy associated with the first entity, wherein the enforcing affects an information packet that is associated with an information packet signature that equals the second signature.

30. The computer program product according to claim 29, wherein the first entity is a user device and the second entity is a RAN cell.

31. The computer program product according to claim 29, wherein the first and second entities belong to a same cell of the RAN.

32. The computer program product according to claim 29, wherein the first and second entities belong to different cells of the RAN.

33. The computer program product according to claim 23, storing instructions for determining a current state of the RAN based on control plane messages intercepted by the probe.

34. The computer program product according to claim 33, wherein the non-transitory computer readable medium stores instructions for determining the current state by determining bandwidth utilization in the RAN.

35. The computer program product according to claim 23, wherein the core network is a General Packet Radio Service (GPRS) network; and wherein the first control metadata is indicative of at least one control plane message that was exchanged between a radio network controller (RNC) that is arranged to control the RAN and a Service GPRS Support Node (SGSN) and intercepting control plane messages exchanged between user equipment (UE) and the SGSN.

36. The computer program product according to claim 23, wherein the core network comprises a Serving Gateway (SGW) and a Mobility Management Entity (MME), wherein the RAN comprises an enhanced node B (eNodeB); and wherein the first control metadata is indicative of at least one control plane message that was exchanged between the eNodeB and the MME.

37. The computer program product according to claim 23, wherein the core network comprises a Serving Gateway (SGW) and a Mobility Management Entity (MME), wherein the RAN comprises an enhanced node B (eNodeB); and wherein the first control metadata is indicative of at least one control plane message that was exchanged between user equipment (UE) and the MME.

38. The computer program product according to claim 23, wherein the core network is a code divisional multiple access (CDMA) network that comprises a Packet Data Serving Node (PDSN) and a Packet Control Function (PCF) that is coupled to a base station controller (BSC); and wherein the first control metadata is indicative of at least one control plane message that was exchanged between at least two entities out of the PCF, the PDSN and the BSC.

39. The computer program product according to claim 23, wherein the assistance of the probe in the enforcing of the policy comprises sending to the policy enforcer instructions relating to the enforcing of the policy.

40. The computer program product according to claim 39, wherein the instructions relating to the enforcing of the policy determine enforcing parameters.

41. The computer program product according to claim 39, wherein the instructions relating to the enforcing of the policy determine which policy to enforce.

42. The computer program product according to claim 23, wherein the processing of the information packets comprises applying a hash function on a checksum field of each of the information packets to provide information packet signatures.

43. A method for enforcing a policy on data plane traffic, the method comprising:
   receiving, by a policy enforcer and from a probe, a first signature and first control metadata; wherein the first control metadata is indicative of at least one control plane message that was exchanged between a radio access network (RAN) and a core network and was intercepted by the probe; wherein the at least one control plane message relates to a first entity that either belongs to the RAN or is coupled to the RAN; wherein the first signature has a predetermined lifespan and wherein the method comprises ignoring the first signature after a duration of the lifespan expired;
   processing, by the probe and by the policy enforcer, information packets received by the policy enforcer to provide information packet signatures, wherein the information packets have undergone an address translation process before being received by the policy enforcer; and
   enforcing, by the policy enforcer, a policy associated with the first entity, wherein the enforcing affects an information packet of the information packets that is associated with an information packet signature that equals the first signature; wherein the address translation process when working correctly does not corrupt the first signature.

* * * * *